(12) United States Patent
Robins et al.

(10) Patent No.: US 6,539,340 B1
(45) Date of Patent: Mar. 25, 2003

(54) METHODS AND APPARATUS FOR MEASURING RESOURCE USAGE WITHIN A COMPUTER SYSTEM

(75) Inventors: Kristen Marie Robins, San Jose, CA (US); John G. Waclawsky, Fredrick, MD (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/460,323

(22) Filed: Dec. 10, 1999

(51) Int. Cl.[7] .............................................. G06F 11/30
(52) U.S. Cl. ...................................... 702/186; 370/232
(58) Field of Search ................................ 702/119, 122, 702/123, 183, 186–188, FOR 103, FOR 104, FOR 134, FOR 135, FOR 170, FOR 171; 370/241, 252, 232; 709/223, 224; 707/6, 100, 101, 102, 103, 104; 703/13, 23

(56) References Cited

U.S. PATENT DOCUMENTS

| | | | |
|---|---|---|---|
| 5,633,861 A | | 5/1997 | Hanson et al. ............... 370/232 |
| 5,706,279 A | * | 1/1998 | Teraslinna .................. 370/232 |
| 5,737,313 A | | 4/1998 | Kolarov et al. ............. 370/234 |
| 5,838,317 A | * | 11/1998 | Bolnick et al. ............. 345/764 |
| 6,041,041 A | * | 3/2000 | Ramanathan et al. ....... 370/241 |
| 6,086,618 A | | 7/2000 | Al-Hilali et al. ............... 703/2 |
| 6,230,204 B1 | * | 5/2001 | Fleming, III ................. 709/229 |
| 6,366,780 B1 | * | 4/2002 | Obhan ........................ 455/453 |
| 6,385,170 B1 | * | 5/2002 | Chiu et al. .................. 370/235 |
| 6,445,682 B1 | * | 9/2002 | Weitz ......................... 370/257 |

* cited by examiner

Primary Examiner—Marc S. Hoff
Assistant Examiner—Mohamed Charioui
(74) Attorney, Agent, or Firm—Chapin & Huang, L.L.C.; David E. Huang, Esq.

(57) ABSTRACT

The invention is directed to techniques for measuring resource usage of a computer when processing a data element, using a usage field assigned to the data element. In one arrangement, the computer includes multiple resources, memory and a controller which is coupled to the multiple resources and the memory. The controller operates in accordance with an application stored in the memory to process data elements using different combinations of the multiple resources. In particular, the application configures the controller to assign a usage field to a data element, process the data element using a combination of the multiple resources, and adjust contents of the assigned usage field to identify particular resources of the combination in order to measure resource usage of the computer and detect patterns of resource usage when processing the data element. The computer can operate in a similar manner to process other data elements in order to obtain resource usage information on a data element by data element basis.

30 Claims, 10 Drawing Sheets

METHODS AND APPARATUS FOR MEASURING RESOURCE USAGE WITHIN A COMPUTER SYSTEM

BACKGROUND OF THE INVENTION

A typical computer system includes performance analysis tools which enable a user such as a system administrator to obtain general performance information describing the operation of the computer. One type of tool enables the system administrator to obtain a snapshot of how much a computer utilizes a particular computer resource (e.g., a processor, a disk or a network resource) at a particular point in time. For example, a typical computer running the UNIX operating system includes utilities for measuring current central processing unit (CPU) utilization (e.g., "cpustat"), disk traffic (e.g., "iostat") and network loading (e.g., "netstat").

In general, each of the above-described tools provides an indication of how much a particular resource is utilized overall within the computer. That is, each tool provides an indication of how much the particular resource is used as a whole, irrespective of which or how many users, processes or programs utilize the particular resource.

In contrast to the above-described tools which provide indications of how much the resources are utilized overall, another type of tool enables a user to run a program and obtain detailed information describing the performance of that program. For example, the UNIX "prof" facility generally works by sampling the program counter several times each second and incrementing a counter each time the computer enters a particular target routine. Another UNIX facility called "gprof" operates in a similar manner but also determines which routine or routines call the particular target routine. Accordingly, the user can run the program for a period of time, and determine approximately how much time is spent in the target routine during that period.

Specialized computer systems may include specialized performance analysis tools for obtaining specific performance information describing the operation of the computer. A specialized computer known as a data communications device (e.g., a router, switch, bridge, etc.) typically includes a utility that enables a network administrator to categorize and count packets processed by the data communications device. Such a utility typically examines an aspect of each packet (or packet sample), and categorizes that packet into one of multiple categories or classes based on that aspect, e.g., by size, source address, destination address, priority, Quality of Service (QoS) class, etc. The utility increments counters corresponding to these categories in order to count the number of packets processed for each category.

For example, a data communications device running a performance analysis utility may categorize and count packets based on QoS class. To this end, the data communications device may use three respective counters to count the number of video QoS packets, audio QoS packets and best efforts QoS packets that the device processes over a period of time. A network administrator can then study the information in these counters to gauge the character of network traffic handled by the data communications device, and then manually configure the data communications device to operate in a more optimized manner on similar network traffic in the future.

SUMMARY OF THE INVENTION

Some computers operate by processing individual data elements (e.g., request signals, messages, network data structures, etc.). During operation, such a computer may process the data elements using different combinations of resources based on particular circumstances. For example, when a disk server receives a request (a data element) to write a block of data to a set of disks, the disk server may be able to perform a simple write operation by generating parity information for the data block, and then writing the data block and parity information to the set of disks. However, when the disk server receives a request to write a small portion of a data block on the disks, the disk server may need to perform a read-modify-write operation by reading an existing data block from the set of the disks, performing a modification routine which modifies part of the read data block with the small portion of the data block, generating parity information for the modified data block, and then storing the modified data block on the disks. Accordingly, the disk server may use resources (e.g., the modification routine) in certain situations but not others.

Similarly, a data communications device typically processes network data structures (data elements) by conveying the network data structures (e.g., packets, frames or cells) from one portion of a network to another. When the data communications device processes these data elements, the data communications device may use different combinations of resources depending on certain circumstances. For example, for certain network data structures, the data communications device may utilize a particular decapsulation or decryption routine to extract routing information from those network data structures. To obtain routing information for other data elements such decapsulation or decryption routines may be unnecessary. Accordingly, the data communications device may use particular resources for certain situations but not others in a manner similar to that of disk servers.

Unfortunately, conventional performance analysis tools generally do not provide resource usage information on a data element by data element basis. For example, a conventional performance analysis tool such as "iostat", which measures disk traffic to one or more disks, does not provide resource usage information about which combinations of resources are used to process each disk access operation. Similarly, a conventional performance tool such as "prof", which indicates how long a program executes in a particular routine, does not provide resource usage information about which resources are used to process a particular data element processed by the program.

In contrast to conventional performance analysis tools, the invention is directed to techniques for measuring resource usage of a computer when processing a data element, using a usage field assigned to the data element.

In one arrangement, the computer includes multiple resources, memory and a controller which is coupled to the multiple resources and the memory. The controller operates in accordance with an application stored in the memory to process data elements using different combinations of the multiple resources. In particular, the application configures the controller to assign a usage field to a data element, process the data element using a combination of the multiple resources, and adjust contents of the assigned usage field to identify particular resources of the combination in order to measure resource usage of the computer when processing the data element. The computer can operate in a similar manner to process other data elements in order to obtain resource usage information on a data element by data element basis. Accordingly, the resource usage information can be used to identify bottlenecks, optimize resource allocation, and resolve performance problems. As a result, the invention can assist capacity planning and improve computer system serviceability, reliability and performance.

The resources can be either hardware-based (e.g., a physical component) or software-based (e.g., a logical construct). Some examples of hardware-based resources are port buffers, hardware circuitry and peripheral devices. Some examples of software-based resources are allocatable data structures, specialized algorithmic routines, and decapsulation/encapsulation, decryption/encryption, and decoding/encoding routines.

In one arrangement, the controller includes markers which modify the contents of the usage field in response to processing the data element using different sets of resources. For example, a first marker can modify the usage field (e.g., set a first bit of the usage field) in response to processing the data element using a first set of resources (e.g., decapsulation and decryption routines). Then, a second marker can re-modify the contents of the usage field (e.g., set a second bit of the usage field) in response to processing the data element using a second set of resources (e.g., encryption and encapsulation routines).

In one arrangement, the application configures the controller to process the data elements using the multiple resources by arranging the resources as nodes which form multiple nodal pathways. In this arrangement, the controller processes the data element by passing the data element among resources belonging to a particular nodal pathway of multiple nodal pathways. To initiate collection of resource usage information, the application configures the controller to dynamically insert a marker as a node at a particular point along the particular nodal pathway. Once the marker is in place, the marker adjusts the contents of the usage field assigned to the data element as the data element passes the particular point along the particular nodal pathway. The controller can later remove the marker from the particular nodal pathway to stop collection of usage information. Accordingly, the controller can dynamically start and dynamically terminate collection of resource usage information.

In another arrangement, the markers pre-exist prior to initiating collection of resource usage information but are dormant. Then, to begin collection of resource usage information, the controller (under direction of the application) activates the pre-existing markers. That is, the controller provides signals to the pre-existing markers to transition the pre-existing markers from their dormant states, in which the pre-existing markers are unable to adjust the contents of the usage field assigned to the data element, to ready states, in which the pre-existing markers are able to adjust the contents of the usage field assigned to the data element. In a similar manner, the controller can inactivate the pre-existing markers. Preferably, the controller can activate or deactivate the pre-existing markers while processing data elements, i.e., dynamically. Furthermore, the controller preferably can activate and/or deactivate the pre-existing markers individually or in groups.

Preferably, the memory of the computer further stores, among other things, a resource usage database. The controller updates the resource usage database according to the contents of the usage field assigned to the data element. There are various arrangements for updating the resource usage database based on the contents of the usage field.

In one arrangement, the controller includes a collector which forms an identifier from the contents of the usage field. The identifier points to a memory location within the resource usage database (e.g., a counter). Accordingly, the collector can index and update memory locations of the resource usage database based on the contents of the usage field assigned to the data element.

In another arrangement, the controller includes a collector which forms, from the contents of the usage field, an identifier which identifies a routine within the resource usage database. Accordingly, the collector can select and execute routines of the resource usage database based on the contents of the usage field.

In yet another arrangement, the controller includes a collector that performs a combinatorial operation (e.g., one or more Boolean operations) using the contents of the usage field. The collector then modifies the resource usage database according to a result of the combinatorial operation.

The controller can include multiple collectors which access the usage field as the computer processes the data element. For example, the controller may include a first collector which updates a resource usage database according to the contents of the usage field assigned to the data element after the data element is processed by a first set of resources. The controller may further include a second collector which further updates the resource usage database according to the contents of the usage field assigned to the data element after the data element is processed by a second set of resources. In one arrangement, the controller activates and deactivates the collectors using signals in a manner similar to the arrangement which involves activating and deactivating markers. In another arrangement which is similar to the arrangement which inserts and removes markers, the resources of the computer form nodal pathways, and the controller inserts collectors within nodal pathways to collect resource usage information and removes the collectors from the nodal pathways to terminate collection of the resource usage information.

Preferably, the application further configures the controller to update the resource usage database according to contents of other usage fields assigned to other data elements. As such, the resource usage database stores resource usage information about the computer when processing multiple data elements. In one arrangement, the computer uses information stored in the resource usage database to control its operation. In particular, the application configures the controller to automatically tune operating parameters of the computer based on the resource usage database to improve operating efficiency of the computer.

One arrangement of the invention is directed to a computer program product that includes a computer readable medium having instructions stored thereon for measuring resource usage of a computer having multiple resources and being capable of processing data elements using different combinations of the multiple resources. When the computer carries out the instructions, the instructions cause the computer to perform the steps of assigning a usage field to a data element, processing the data element using a combination of the multiple resources, and adjusting contents of the assigned usage field to identify particular resources of the combination in order to measure resource usage of the computer when processing the data element. Accordingly, the computer program product facilitates collection of resource usage information in a computer on a data element by data element basis.

Preferably, the step of adjusting includes the steps of modifying the contents of the usage field in response to processing the data element using a first set of resources, and re-modifying the contents of the usage field in response to processing the data element using a second set of resources.

Additionally, the instructions preferably further cause the computer to perform the steps of updating a resource usage database according to the contents of the usage field assigned to the data element, and updating the resource usage database according to contents of another usage field assigned to another data element in order to store resource usage information about the computer when processing multiple data elements.

Furthermore, the instructions preferably further cause the computer to update the resource usage database according to the contents of the usage field assigned to the data element after the data element is processed by a first set of resources, and further update the resource usage database according to the contents of the usage field assigned to the data element after the data element is processed by a second set of resources.

The features of the invention, as described above, may be employed in data communications devices and other computerized devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

The invention is directed to techniques for measuring resource usage of a computer when processing data elements (e.g., request signals, messages, network data structures, etc.). The techniques involve assigning usage fields to the data elements, and adjusting the contents of the assigned usage fields to identify particular computer resources of the computer which are used to process the data elements. As such, the computer can obtain resource usage information for processing the data elements on a data element by data element basis. For example, in the context of a computerized data communications device, resource usage can be measured or traced on a real-time packet-by-packet or cell-by-cell basis.

Figure 1:
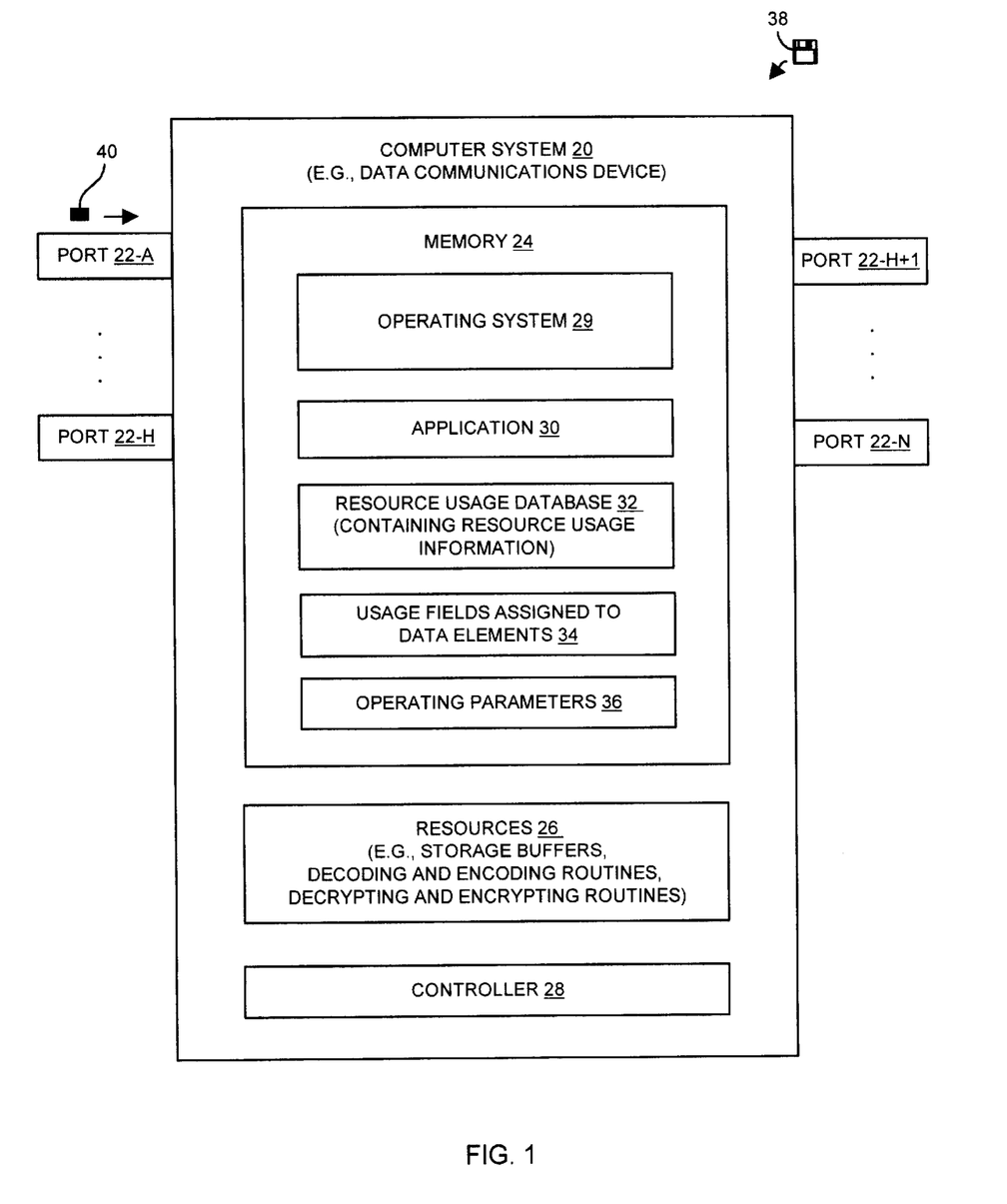
FIG. 1 shows a block diagram of a computer system, e.g., a data communications device, which is suitable for use by the invention.

FIG. 1 shows a computer system 20 that is suitable for use by the invention. The computer system 20 includes ports 22 (e.g., ports 22-A, ..., 22-H, 22-H+1, ..., 22-N), memory 24, resources 26 and a controller 28. The memory 24 stores, among other things, a variety of memory constructs including an operating system 29, an application 30, a resource usage database 32, usage fields 34 and operating parameters 36. Preferably, the computer system 20 includes a processor which operates in accordance with the operating system 29 and the application 30 to form at least a portion of the controller 28 and the resources 26.

In one arrangement, a computer program product 38 (e.g., one or more CDROMs, diskettes, tapes, etc.) provides one or more of the above-listed memory constructs (e.g., the application 30) to the computer system 20. For example, in one arrangement, the computer program product 38 includes the operating system 29 and the application 30. In this arrangement, the operating system 29 and the application 30 can be installed on the computer system 20, and then invoked to create other memory constructs such as the resource usage database 32 and usage fields 34. The Cisco IOS manufactured by Cisco Systems of San Jose, Calif. is suitable for use as the operating system 29. As an alternative example, the computer system 20 can acquire the application 30 through other means, e.g., via a network download through one of the ports 22.

The computer system 20 operates in accordance with the application 30 and the operating parameters 36 to perform a set of data processing operations. In particular, the application 30 includes instructions (e.g., executable code) which direct the computer system 20 to process, or operate on, a set of data elements 40. Preferably, the data elements 40 are data structures (e.g., messages, requests, network packets, etc.) which the computer system 20 processes in order to achieve a particular goal (e.g., in order to operate as a disk server, a compute server or a data communications device). During operation, the controller 28 assigns usage fields 34 to the data elements 40, and adjusts the contents of the usage fields 34 so that their contents identify resources 26 which the computer system 20 uses to process the data elements 40. Preferably, the usage fields 34 are administrative headers of the data elements 40 to which the controller 28 tags with information (e.g., sets bit patterns) indicating which resources were used to process the data elements 40. Accordingly, resource usage information can be obtained by the computer system 20 on a data element by data element basis.

The controller 28 collects and stores this resource usage information in the resource usage database 32. The resource usage information is retrievable for use in improving the operation of the computer system 20. For example, the resource usage information can be used to modify the operating parameters 36 (e.g., buffer sizes, page table sizes, memory allocation amounts for particular processes, process priority information, etc.) which influence how well the computer system 20 operates. In one arrangement, the controller 28 automatically tunes the operating parameters 36 of the computer system 20 based on the updated resource usage database 32 to improve operating efficiency of the computer system 20. In another arrangement, a user such as a system administrator of the computer system 20 analyzes the resource usage information stored within the resource usage database 32, and subsequently tunes the computer system 20 manually. In this manner, the resource usage information can be used to identify bottlenecks, optimize resource allocation, improve reliability and resolve performance problems.

Figure 2:
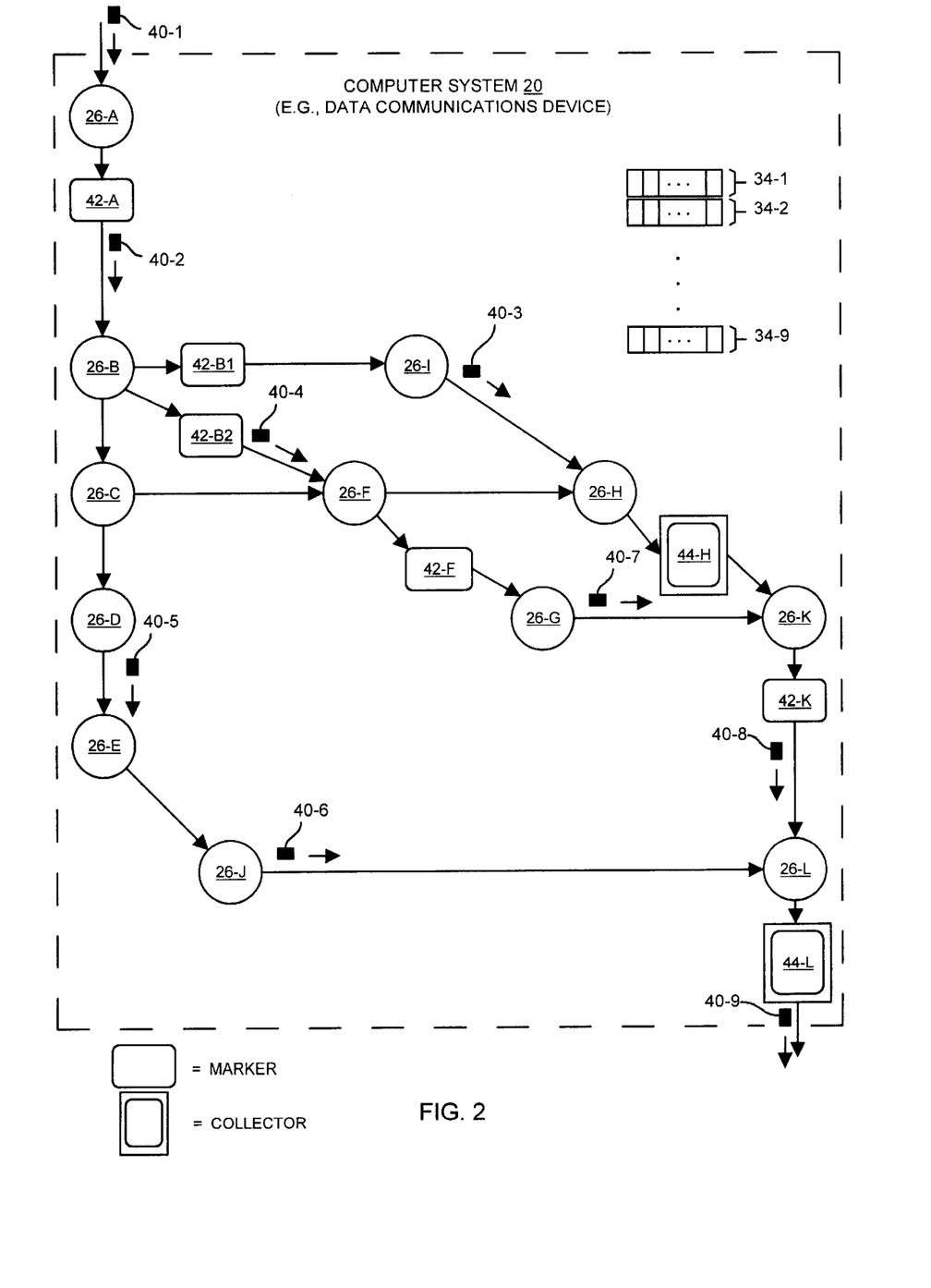
FIG. 2 shows, by way of example only, a block diagram of various resources and components within the computer system of FIG. 1.

Further details of the invention will now be provided with reference to FIG. 2 which shows the resources 26 as nodes that form multiple nodal pathways for processing the data elements 40. As shown in FIG. 2, resources 26-A, 26-B, 26-I, 26-H, 26-K and 26-L form one nodal pathway. Similarly, resources 26-A, 26-B, 26-F, 26-G, 26-K and 26-L form another nodal pathway. It should be understood that nodal pathways can overlap when the nodal pathways (such as the two described above) share one or more resources 26.

When a data element 40 arrives at the computer system 20, the controller 28 directs that data element 40 down a particular nodal pathway. The first resource 26 processes that data element 40 and sends that data element 40 further down the pathway, and so on until that data element 40 is fully processed by all of the resources 26 of that nodal pathway. For example, the nodal pathway, which is formed by resources 26-A, 26-B, 26-I, 26-H, 26-K and 26-L, processes data element 40-3, as shown in FIG. 2.

A short example of how the resources 26 of the computer system 20 operate on a data element 40 in order to process that data element 40 will now be provided to facilitate understanding of the nodal pathway arrangement shown in FIG. 2. Suppose that the computer system 20 is a data communications device which processes, as the data elements 40, network packets according to protocols used by the packets. In this example, suppose that node 26-A is an Internet Protocol (IP) decryption routine, node 26-B is an IP decompression routine, node 26-F is an IP switching routine, node 26-G is an IP compression routine, node 26-K is an IP encryption routine, and node 26-L is a scheduler.

When the computer system 20 receives an IP packet (i.e., a data element 40) from a network through an incoming port 22, the decryption routine (node 26-A) processes the IP packet by performing a decrypting procedure on the packet (e.g., to unscramble information within the packet), and passing the IP packet to the decompression routine (node 26-B). The decompression routine processes the packet by performing a decompression procedure on the packet (e.g., to return information within the packet to a better readable form), and then passes the packet to the IP packet update routine (node 26-F). The IP switching routine decides which port 22 to send the packet and also performs an update procedure on the packet (e.g., to update a time-to-live count, to recalculate a checksum, to determine the outgoing interface, etc.) and passes the packet to the IP compression routine (node 26-G). The IP compression routine performs a compression procedure on the packet, and passes the packet to the IP encryption routine (node 26-K). The IP encryption routine encrypts the packet, and passes the packet to the scheduler for transmission (node 26-L). The scheduler then schedules the packet for transmission back into the network through an outgoing port 22.

As explained above and as illustrated in FIG. 2, the resources 26 form nodes within nodal pathways. The controller 28 includes markers 42 and collectors 44 which form nodes within the nodal pathways, as well. Further details of the markers 42 and the collectors 44 will now be provided.

The markers 42 are capable of adjusting contents of usage fields 34 which the controller 28 assigns to the data elements 40. In the example of FIG. 2, the computer system 20 includes a marker 42-B1 after resource 26-B (i.e., interconnected between resources 26-B and 26-I), a marker 42-B2 after resource 26-B (i.e., interconnected between resources 26-B and 26-F), a marker 42-F after resource 26-F (i.e., interconnected between resources 26-F and 26-G), and a marker 42-K after resource 26-K (i.e., interconnected between resources 26-K and 26-L).

Additionally, the collectors 44 are capable of updating the resource usage database 32 based on the contents of the usage fields 34 assigned to the data elements 40. In the example of FIG. 2, the computer system 20 includes a collector 44-H after resource 26-H (i.e., interconnected between resources 26-H and 26-K) and a collector 44-L after resource 26-L.

Figure 3:
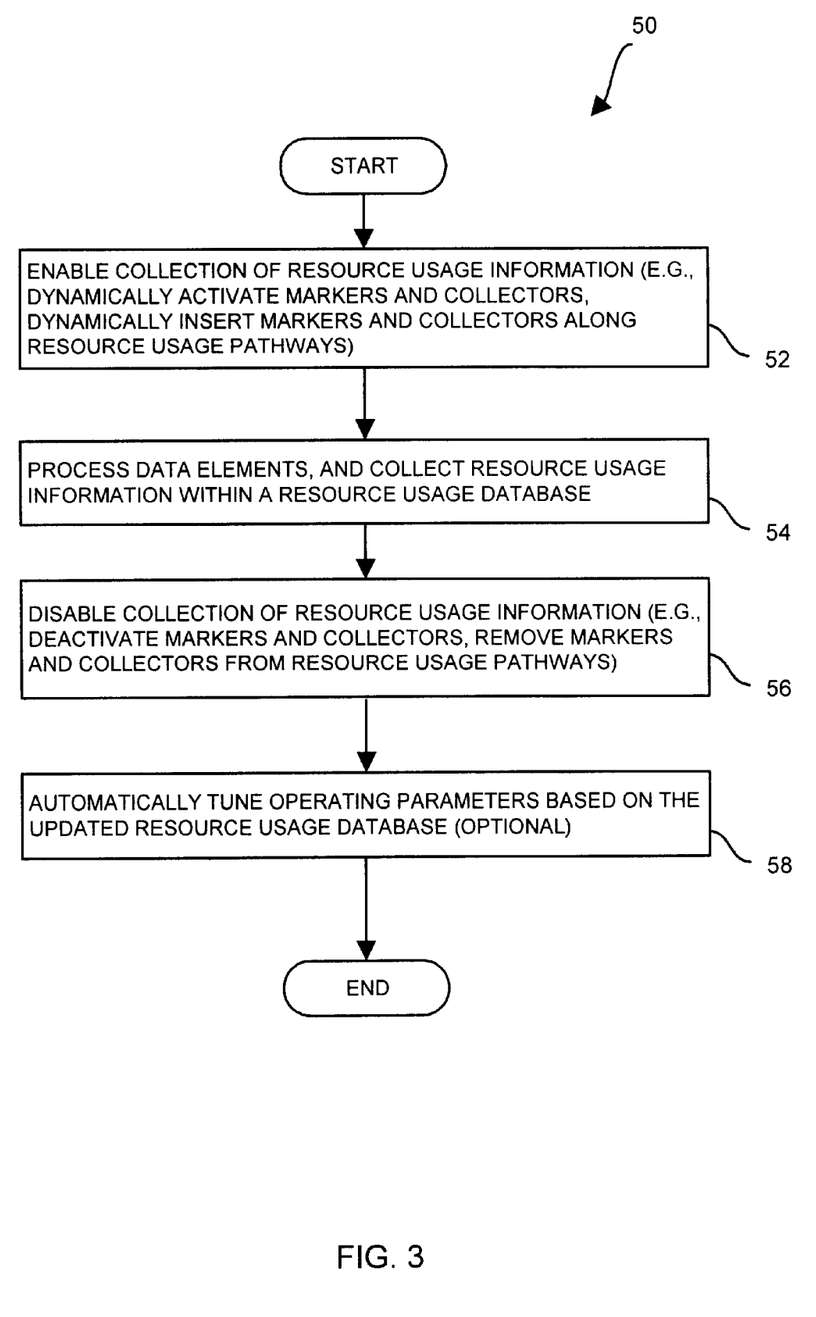
FIG. 3 shows a flow diagram of a procedure performed by the computer system of FIG. 1 when in operation.

The operation of the computer system 20 will now be explained in further detail with reference to FIG. 3 which shows a procedure 50 performed by the computer system 20. In step 52, the computer system 20 enables collection of resource usage information. There are various ways to accomplish this.

In one arrangement, the controller 28 inserts the markers 42 and the collectors 44 as nodes within the nodal pathways formed by the resources 26. Such insertion can occur dynamically, i.e., while the resources 26 of the computer system 20 operate to process the data elements 40.

In another arrangement, the controller 28 activates the markers 42 and the collectors 44 which pre-exist as nodes within the nodal pathways formed by the resources 26. That is, the marker 42 and collectors 44 are inserted within the nodal pathways prior to performing the procedure 50, and step 52 merely involves activating the pre-existing markers 42 and collectors 44 (e.g., using one or more activation signals).

In step 54, the resources 26 process the data elements 40, and the computer system 20 operates to collect resource usage information within the resource usage database 32. In particular, once step 54 begins, the controller 28 assigns a respective usage field 34 to each newly received data element 40. For example, as shown in FIG. 2, the controller 28 assigns a usage field 34-1 as data element 40-1 enters the computer system 20. Previously, the computer system 20 assigned a usage field 34-9 as data element 40-9 entered the computer system 20, a usage field 34-8 as data element 40-8 entered the computer system 20, and so on.

Additionally, in step 54, the markers 42 operate to adjust the usage fields 34 of the data elements 40 to indicate which resources 26 processed the data elements 40. In particular, as the data elements 40 travel along the nodal pathways (see FIG. 2), the data elements 40 encounter markers 42. When a data element 40 encounters a particular marker 42, that marker 42 adjusts the contents (i.e., one or more bits) of the usage field assigned to that data element 40. For example, when data element 40-8 travels from the resource 26-K to the marker 42-K (see FIG. 2), the marker 42-K adjusts the contents of the usage field 34-8 which is assigned to the data element 40-8 such that the usage field 34-8 indicates that the resource 26-K processed the data element 40-8. Similarly, when data element 40-4 travels from the resource 26-B to the marker 42-B2 (see FIG. 2), the marker 42-B2 adjusts the contents of the usage field 34-4 which is assigned to the data element 40-4 such that the usage field 34-4 indicates that the resource 26-B processed the data element 40-4.

Furthermore, in step 54, the collectors 44 operate to update the resource usage database 32 based on the contents of the usage fields 34 to obtain resource usage information on a data element by data element basis. In particular, as the data elements 40 travel along the nodal pathways, the data elements 40 may encounter collectors 44. When a data element 40 encounters a particular collector 44, that collector 44 reads the contents of the usage field 34 assigned to that data element 40, and updates the resource usage database 32 based on the contents of that usage field 34. For example, when data element 40-9 travels from the resource 26-L to the collector 44-L, the collector 44-L reads the contents (i.e., one or more bits) of the usage field 34-9 which is assigned to the data element 40-9 and updates the resource usage database 32 based on the contents of the data element 40-9. Similarly, when a data element 40 travels from the resource 26-H to the collector 44-H, the collector 44-H reads the contents of the usage field 34 assigned to that data element 40 and updates the resource usage database 32 based on the contents of that data element 40.

In step 56, the controller 28 disables collection of resource usage information. In one arrangement, the controller 28 removes the markers 42 and collectors 44 from the nodal pathways formed, in part, by the resources 26. In another arrangement, the controller 28 signals the markers 42 and collectors 44 to transition the markers 42 and collectors 44 from active states to dormant states to terminate collection of resource usage information.

In one arrangement, in step 58, the controller 28 automatically tunes the operating parameters 36 (see FIG. 1) based on the resource usage information collected within the resource usage database 32. In particular, the controller 28 analyzes the resource usage information, and modifies the operating parameters (if necessary) to improve the operation of the computer system 20 (e.g., to increase the efficiency and performance of the computer system 20). Accordingly, the resource usage information can be used to identify bottlenecks, optimize resource allocation, and resolve performance problems.

Figure 4:
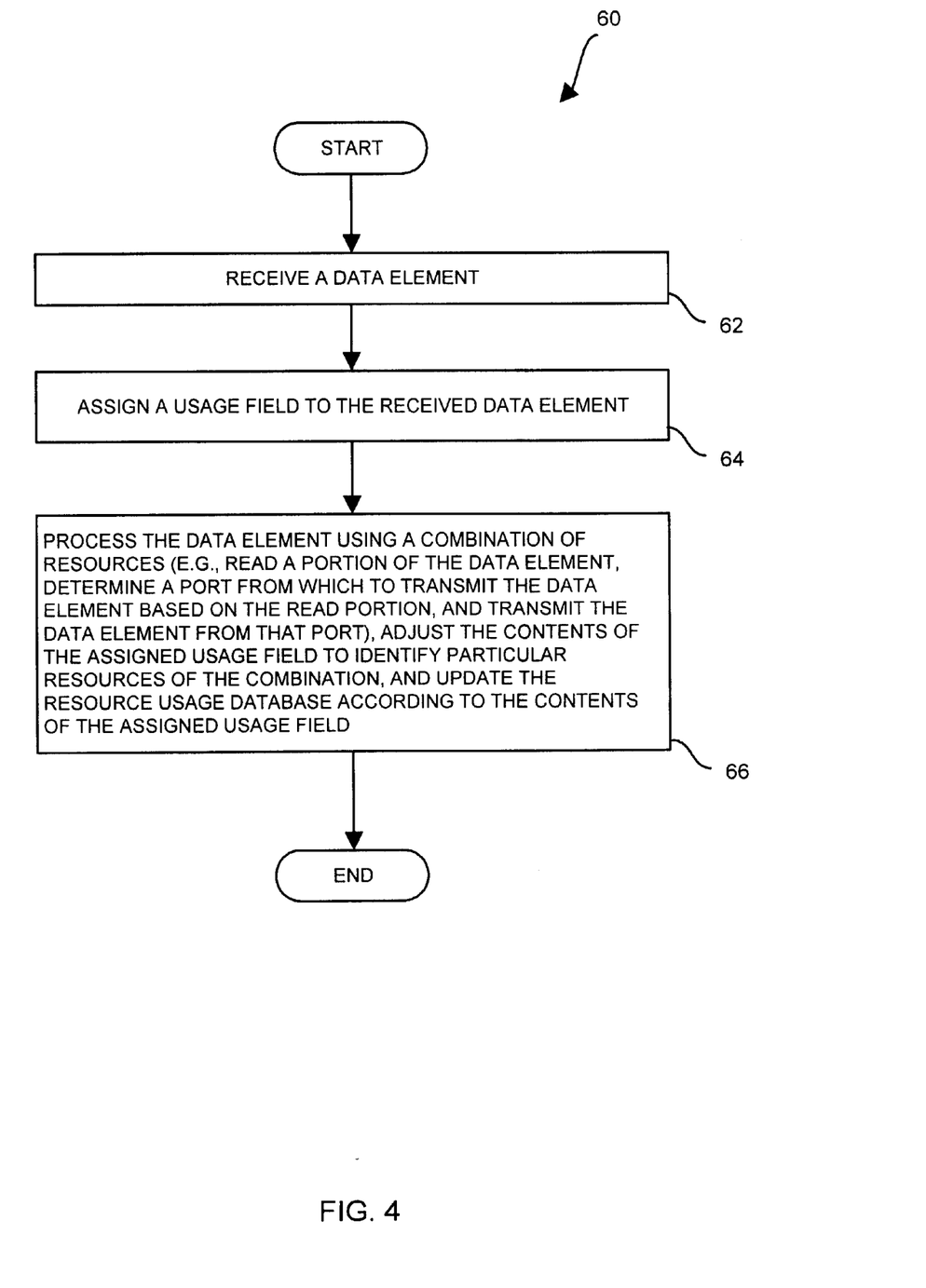
FIG. 4 shows a flow diagram of a procedure which is suitable for use as one of the steps of the procedure of FIG. 3.

FIG. 4 shows a procedure 60 which the computer system 20 performs as part of step 54 when collecting resource usage information for an individual data element 40. In step 62, the computer system 20 receives a data element 40. For example, if the computer system is a data communications device as described earlier, the computer system 20 receives a network packet for routing.

In step 64, the controller 28 assigns a usage field 34 to the received data element 40. In the data communications device example, the controller 28 assigns a usage field 34 to the network packet.

In step 66, a combination of resources 26 processes the data element 40, e.g., routes the network packet. Additionally, one or more markers 42 in the nodal path adjust the contents of the usage field 34 to identify the particular resources 26 of the combination, and one or more collectors 44 read the contents of the usage field 34 and update the resource usage database 32 based on the read contents of the usage field 34 in order to obtain resource usage information for a single data element 40.

Figure 5A:
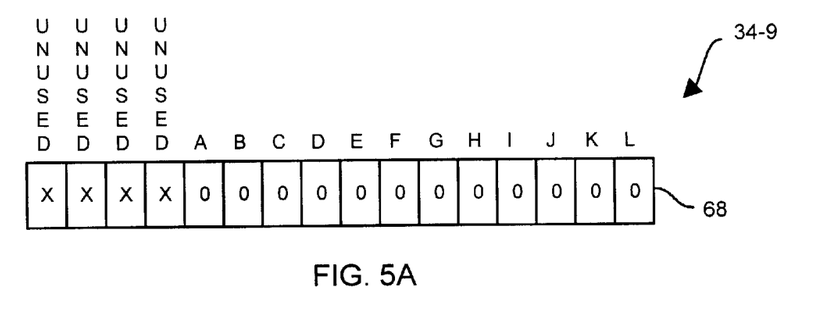
FIG. 5A shows, by way of example only, a usage field assigned to a particular data element of FIG. 2 prior to being processed by a resource and passing a marker of FIG. 2.

FIGS. 5A, 5B, 5C and 5D show, by way of example only, the contents of a usage field 34-9 assigned to a data element 40-9 which is processed by the resources 26 of the computer system 20. Suppose that the data element 40-9 travels along a nodal pathway formed by resources 26-A, 26-B, 26-I, 26-H, 26-K and 26-L (also see FIG. 2). When the computer system 20 initially receives the data element 40-9, the controller 28 assigns sage field 34-9 to the data element 40-9. FIG. 5A shows the usage field 34-9 when the controller 28 initially assigns the usage field 34-9 to the data element 40-9 and prior to processing the data element 40-9 using any resources 26.

Figure 5B:
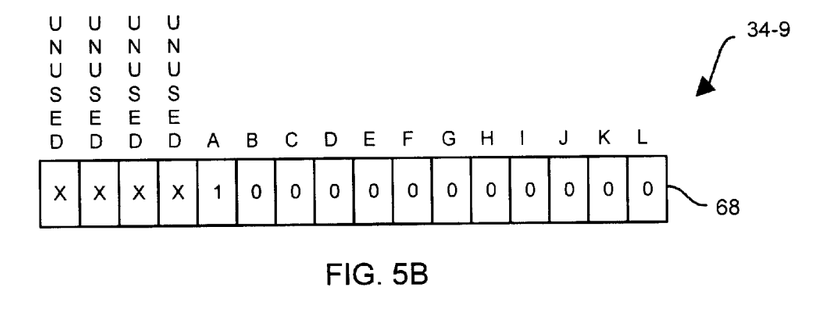
FIG. 5B shows, by way of example only, the usage field of FIG. 5A after the particular data element is processed by a first resource and passing a first marker of FIG. 2.

Suppose that the resource 26-A then processes the data element 40-9. When the data element 40-9 leaves the resource 26-A, the data element 40-9 arrives at a marker 42-A which adjusts the contents (i.e., one or more bits) of the usage field 40-9 to identify particular resources 26 which have processed the data element 40-9. As shown in FIG. 5B, the marker 42-A sets the bit in location "A" of the usage field 34-9 to indicate that resource 26-A has processed the data element 40-9. The data element 40-9 then leaves the marker 42-A and arrives at resource 26-B.

Figure 5C:
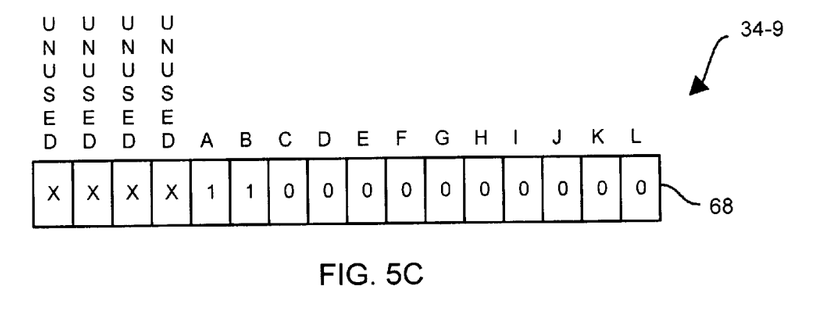
FIG. 5C shows, by way of example only, the usage field of FIG. 5B after the particular data element is processed by a second resource and passing a second marker of FIG. 2.

Resource 26-B then further processes the data element 40-9 and sends the data element 40-9 further along to marker 42-B1. Marker 42-B1 adjusts the contents of the usage field 34-9 to indicate that resource 26-B has processed the data element 40-9. In particular, as shown in FIG. 5C, the marker 42-B1 sets the bit in location "B" of the usage field 34-9 to identify resource 26-B.

Resource 26-I then processes the data element 40-9. Since the nodal path does not include a marker 42 after the resource 26-I, the usage field 34-9 is not updated to indicate processing of the data element 40-9 by resource 26-I. In a similar manner, resource 26-H processes the data element 40-9, and since the nodal path does not include a marker 42 after the resource 26-H, the usage field 34-9 is not updated to indicate processing of the data element 40-9 by resource 26-H.

The data element 40-9 then reaches a collector 44-H and, in response, the collector 44-H reads the contents of the usage field 34-9 (i.e., one or more bits of the usage field 34-9) and updates the resource usage database 32 according to the contents of the usage field 34-9. Accordingly, the resource usage database 32 now stores resource usage information regarding the processing of the data element 40-9.

Figure 5D:
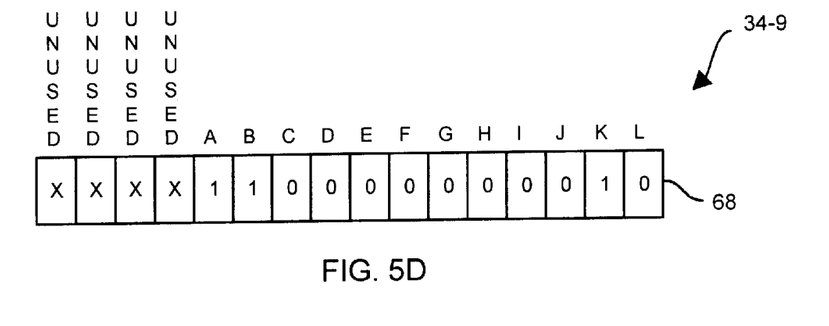
FIG. 5D shows, by way of example only, the usage field of FIG. 5C after the particular data element is processed by a third resource and passing a third marker of FIG. 2.

Resource 26-K then processes the data element 40-9, and sends the data element 40-9 to the marker 42-K. The marker 42-K then adjusts the contents of the usage field 34-9 to indicate processing of the data element 40-9 by resource 26-K. In particular, as shown in FIG. 5D, the marker 42-K sets a bit location "K" corresponding to resource 26-K.

The resource 26-L then processes the data element 40-9 and provides the data element 40-9 to a collector 44-L. When the collector 44-L receives the data element 40-9, the collector 44-L reads at least a portion of the usage field 34-9 and updates the resource usage database 32 according to the read contents of the usage field 34-9. Accordingly, the resource usage database 32 now stores resource usage information regarding further processing of the data element 40-9. Since data element 34-9 has been fully processed by the resources 26, the usage field 34-9 (and the resource usage database 32 which is updated to reflect the contents of the usage field 34-9) provides a trace of the resources 26 used when processing the data element 40-9 through the nodal path of the computer system 20.

It should be understood that adjustment of the usage field 34-9 does not necessarily occur after each resource 26 processes the data element 40-9 to which the usage field 34-9 is assigned. Rather, such adjustment to indicate processing by a particular resource 26 only occurs when there is a marker 42 that follows the particular resource 26 (e.g., the marker 42-A which follows resource 26-A). There is no updating of the usage field 34-9 to indicate processing by a particular resource 26 when no marker 42 follows the particular resource (e.g., there is no marker following resource 26-I to indicate processing of the data element 40-9 by resource 26-I). Accordingly, if resource usage information is desired for a particular resource 26 (e.g. resource 26-I), a new marker 42 should be installed into the nodal path after that particular resource 26.

Similarly, it should be understood that no updating of the resource usage database 32 occurs unless the data element 40-9 encounters a collector 44 (e.g., collector 44-L). If the data element 40-9 does not encounter a collector 44, the usage field 34-9 will not be read, and the resource usage database 32 will not be updated. To store resource usage information after a particular resource 26, a new collector 44 should be installed into the nodal path after that particular resource 26.

Figure 6:
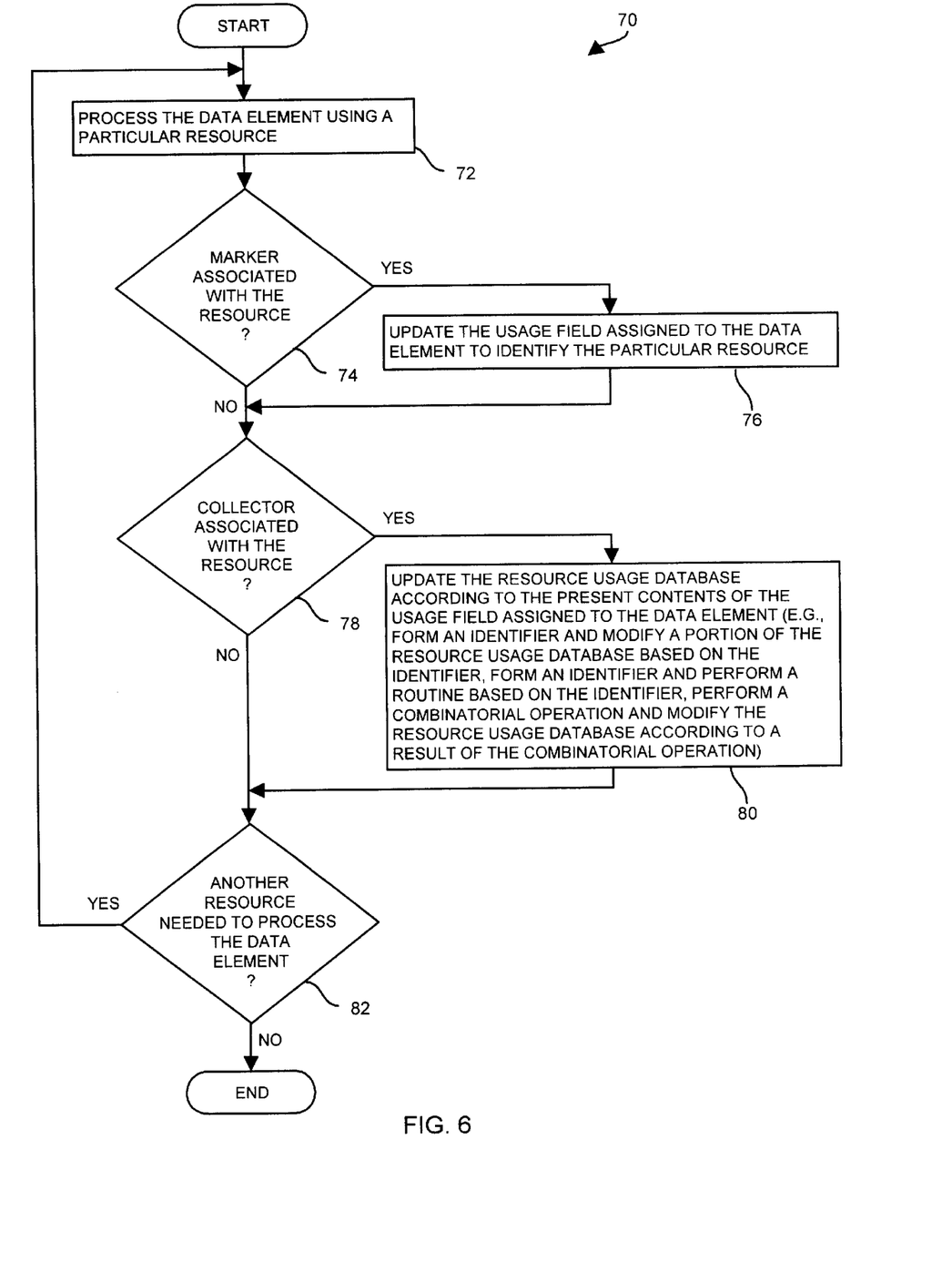
FIG. 6 is a flow diagram of a procedure 70 which the computer system of FIG. 2 performs on a data element.

FIG. 6 shows a flow diagram illustrating the operation 70 (or procedure 70) of the computer system 20 from the perspective of a single data element 40 (e.g., data element 40-9) traveling along a particular nodal pathway formed by resources 26, markers 42 and collectors 44.

In step 72, a resource (e.g., resource 26-A) processes the data element (e.g., data element 40-9). In step 74, if there is a marker 42 associated with that resource (e.g., if there is a marker 42 which follows that resource (e.g., marker 42-A), step 74 proceeds to step 76. Otherwise, step 74 proceeds to step 78.

In step 76, the marker 42 updates the usage field 34 assigned to that data element 40 to identify that resource (e.g., marker 42-A updates usage field 34-9 to indicate processing of the data element 40-9 by resource 26-A).

In step 78, if there is a collector 44 associated with that resource (e.g., if there is a collector 44 which follows that resource), step 78 proceeds to step 80. Otherwise, step 78 proceeds to step 82.

In step 80, the collector 44 reads the contents of the usage field 34 assigned to that data element 40 and updates the resource usage database 32 based on these contents. Accordingly, the resource usage database 32 is updated on a data element by data element basis.

In step 82, if another resource 26 is in the nodal pathway, step 82 proceeds back to step 72. If there are no other resources in the nodal pathway (i.e., the computer system 20 has fully processed the data element 40), the operation 70 ends.

Figure 7:
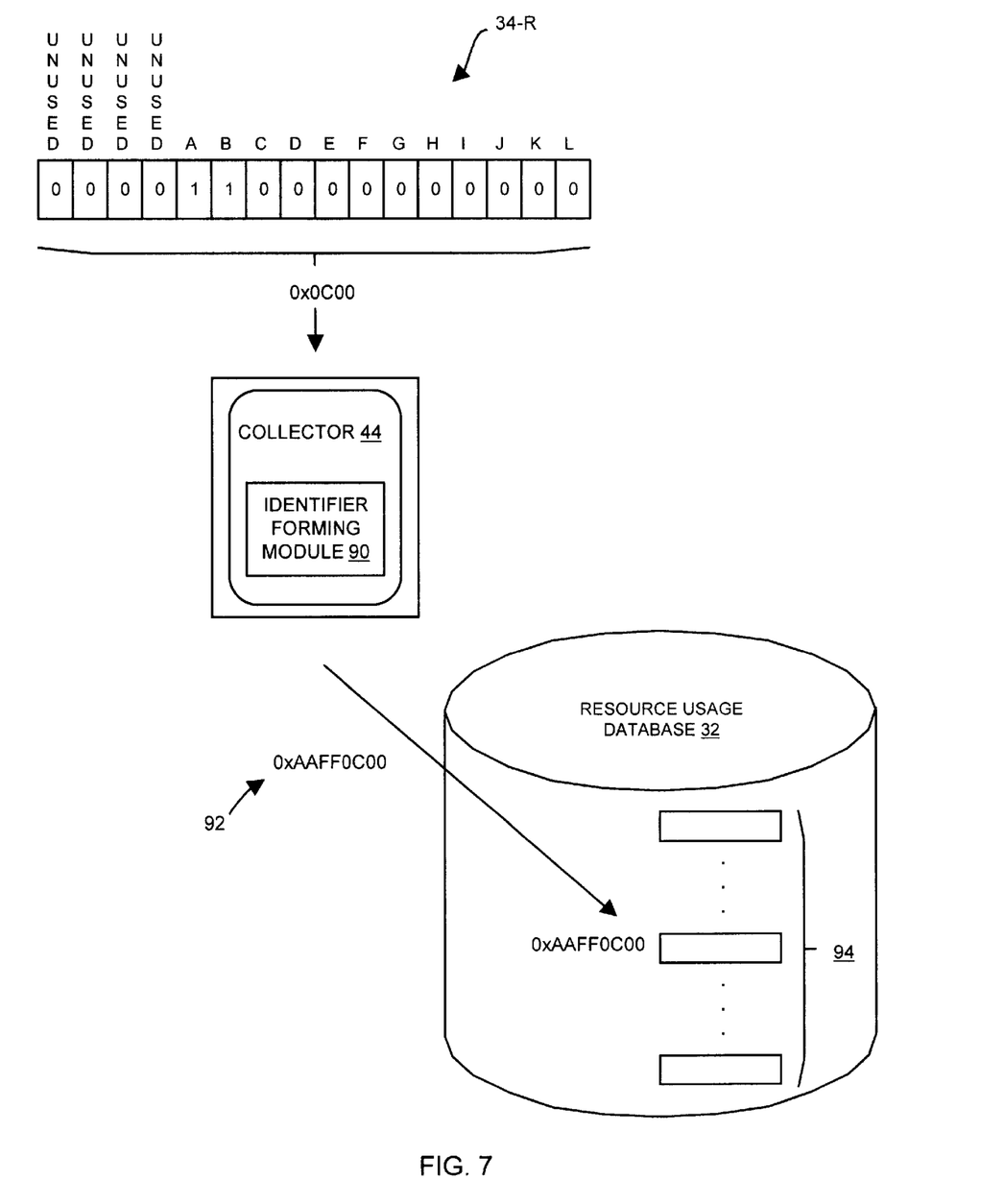
FIG. 7 shows, by way of example only, a block diagram of an arrangement for identifying components of a resource usage database of the computer system of FIG. 1 based on the contents of a usage field assigned to a data element.

FIG. 7 shows, by way of example only, a block diagram of an arrangement for a collector 44 which updates the resource usage database 32. The collector 44 includes an identifier forming module 90 that reads the bits of the usage field 34-R and provides an address, e.g., "0xAAFF0C00", which references one of many memory locations 94 of the resource usage database 32. The collector 44 then updates that memory location 94 (e.g., by incrementing the contents of the referenced memory location 94) to reflect processing of a data element 40 to which the usage field 34-R is assigned. In this way, individual resource usage or groupings and patterns of resource usage can be tracked. For example, if whenever buffer A is used buffer B is used, system optimization can be done by expanding the size of buffer A or allocating both buffers simultaneously.

Figure 8A:
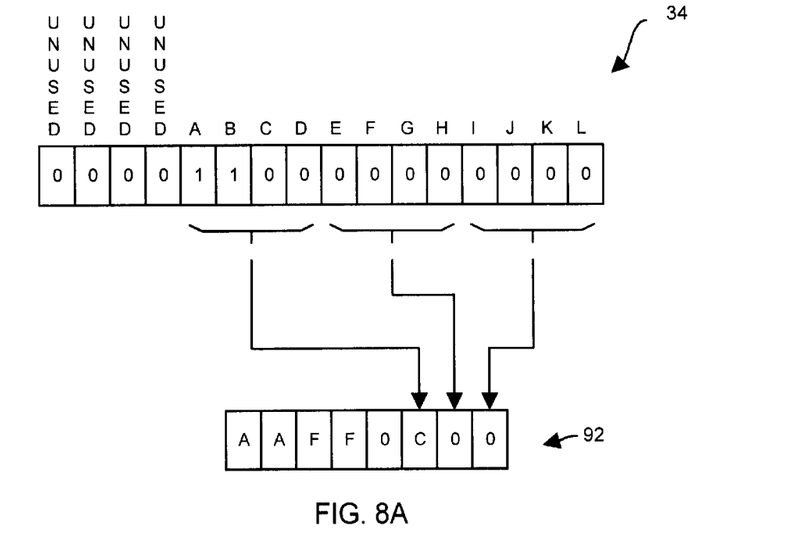
FIG. 8A shows, by way of example only, a block diagram of an arrangement for constructing an address based on the contents of a usage field assigned to a data element.

It should be understood that arrangements for updating the resource usage database 32 other than that shown in FIG. 7 are suitable for use by the invention. In one arrangement, as shown in FIG. 8A, only portions of the usage field 34 (rather than the entire usage field 34) are used to generate an address or pointer 92 which identifies a location within the resource usage database 32.

Figure 8B:
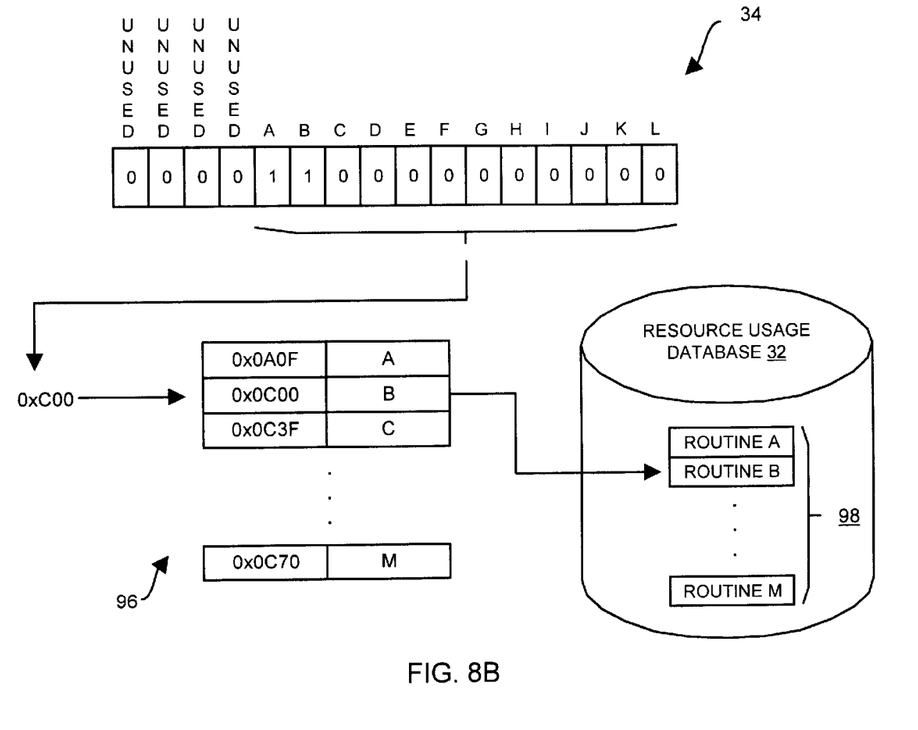
FIG. 8B shows, by way of example only, a block diagram of an arrangement for constructing a routine identifier based on the contents of a usage field assigned to a data element.

In another arrangement, as shown in FIG. 8B, the contents (one or more bits) of the usage field 34 are used to generate a key (e.g., "0x0C00") to a lookup table 96 in order to identify one of multiple routines 98 within the resource usage database 32. As illustrated in FIG. 8B, the contents of the usage field 34 generates a key that identifies a routine "B" of the resource usage database 32.

Figure 8C:
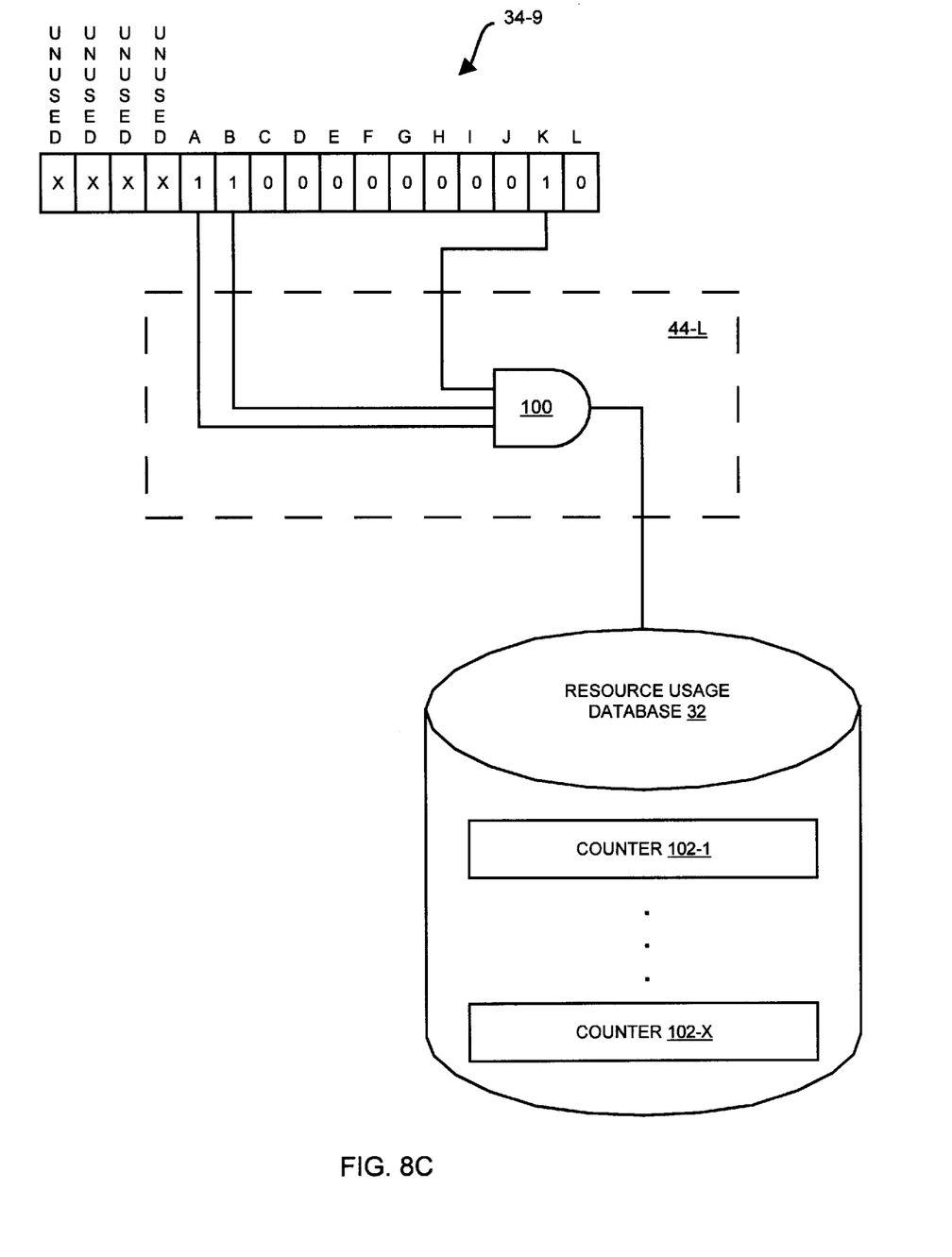
FIG. 8C shows, by way of example only, a block diagram of an arrangement for performing a combinatorial operation to select a component of the resource usage database of FIG. 1 based on the contents of a usage field assigned to a data element.

In yet another arrangement, a collector 44 performs a combinatorial operation based on the contents (i.e., the values of one or more bits) of each usage field 34. A result of the combinatorial operation identifies a memory location within the resource usage database 32 (e.g., one of counters 102-1, . . . , 102-X). For example, as shown in FIG. 8C, the collector 44-L of the computer system 20 (also see FIG. 2) can perform, as a combinatorial operation, a logical AND operation 100 which uses, as inputs, the values of usage field bits "A", "B" and "K". By way of example only and as shown in FIG. 8C, the logical AND operation 100 operates on the usage field 34-9 (also see FIG. 5D) which is assigned to data element 40-9, which was earlier-described as travelling along the pathway formed by resources 26-A, 26-B, 26-I, 26-K and 26-L. The result of the logical AND operation 100 selects a particular counter 102 within the resource usage database 32 in order to indicate processing of the data element 40-9 by the set of resources 26-A, 26-B and 26-K. Some data elements 40 may not use the same set of resources 26, and therefore cause the collector 44-L to identify a different counter 102. The above-described arrangement enables the resource usage database 32 to store information on patterns of resource usage.

Figure 9A:
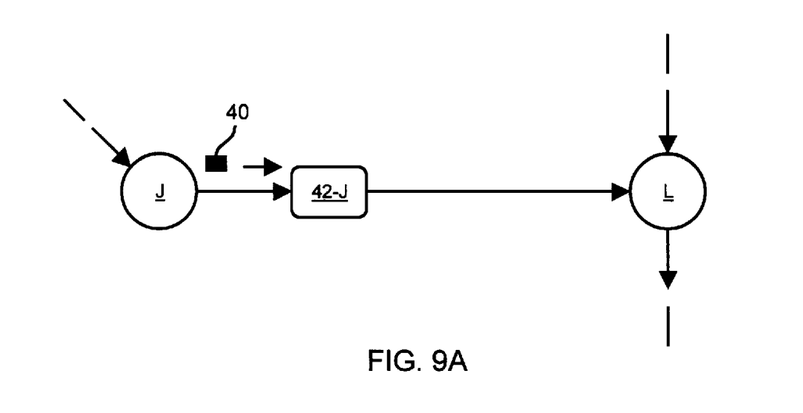
FIG. 9A shows, by way of example only, a block diagram of how a marker can be inserted into a portion of a nodal pathway formed by resources of FIG. 2.

It should be understood that the particular arrangement of markers 42 and collectors 44 within the nodal pathways formed by the resources 26 determine what resource usage information is to be collected and stored in the resource usage database 32. Additional markers 42 will provide more opportunity to adjust the usage fields 34 assigned to the data elements 40 processed by the resources 26. For example, as shown in FIG. 9A, placement of an additional marker 42-J after the resource 26-J now provides the computer system 20 with the ability to adjust the usage fields 34 to indicate processing of data elements by the resource 26-J. In a similar manner, additional collectors 44 will provide more opportunity to update the resource usage database 32 according to the usage fields 34 assigned to the data elements 40. It should be understood that the insertion (or removal) of markers 42 or collectors 44 can occur during operation of the computer system 20 (i.e., into active traffic flows through the nodal resource pathways) to provide "on-the-fly" customization.

Figure 9B:
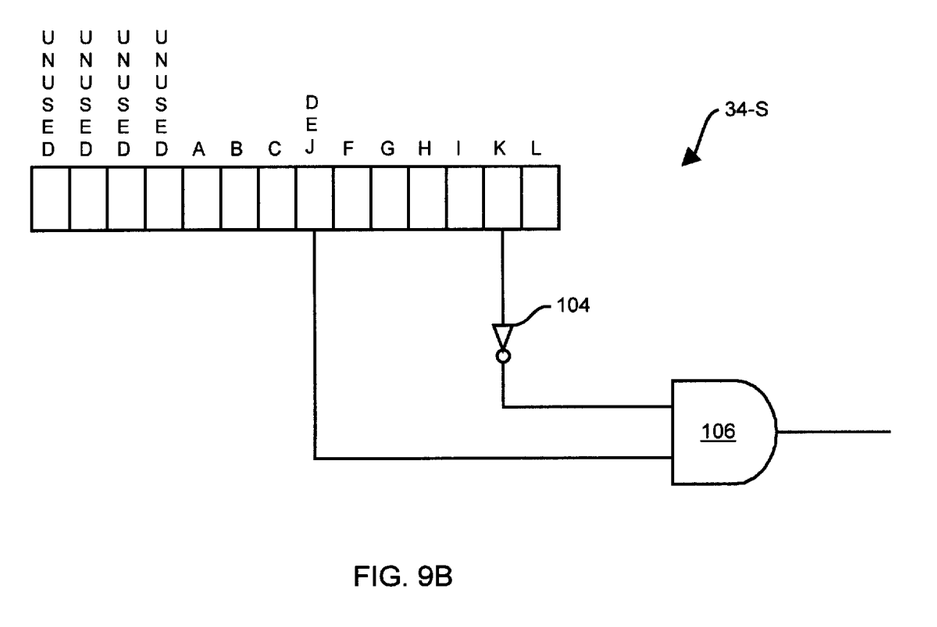
FIG. 9B shows, by way of example only, a block diagram of an alternative usage field which is assignable to a data element for use with the marker of FIG. 9A.

Furthermore, it should be understood that the usage field 34 does not require a one-to-one correspondence between bits and resources 26. Rather, as shown by way of example only in FIG. 9B, a single bit of the usage field 34 can correspond to multiple resources 26. As shown in FIG. 9B, a particular bit "DEJ" corresponds to a set of resources 26-D, 26-E and 26-J. Accordingly, setting of bit "DEJ" (e.g., by marker 42-J, see FIGS. 2 and 9A) identifies processing of a data element 40 to which the usage field 34 of FIG. 9B is assigned by resources 26-D, 26-E and 26-J. By way of example only, multiple logical operations 104 and 106 are performed to generate a combinatorial result from the usage field 34 of FIG. 9B.

It should be understood that the resource arrangement of FIG. 2 is provided by way of example only, and that other resource arrangements are suitable for use by the invention. For example, a similar arrangement of resources, which is suitable for use by the invention, is provided in U.S. application Ser. No. 09/419,035 (Moberg et. al.), the teachings of which are hereby incorporated by reference in their entirety. In U.S. application Ser. No. 09/419,035, the arrangement operates as a data communications device. The resources of the data communications device are arranged as chains of elements, and a "chain walker" processes a packet by passing the packet to each element (resource) of a particular chain. It should be understood that the arrangement of U.S. application Ser. No. 09/419,035 is provided by way of example only, and other arrangements are suitable for use by the invention as well.

As described-above, the arrangements of the invention involve obtaining resource usage information about a computer system 20 using usage fields 34 assigned to data elements 40 processed by the controller 28. The usage fields 34 enable resource usage information to be collected on a data element by data element basis, and resource usage patterns to be identified. This resource usage information can be used to identify bottlenecks, optimize resource allocation, and resolve performance problems without disturbing uninstrumented traffic flows. The features of the invention may be particularly useful in computerized devices manufactured by Cisco Systems, Inc. of San Jose, Calif.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the computer system 20 does not always need to collect resource usage information while operating. Rather, collection of the resource usage information can be switched on or off, e.g., only used for diagnostic purposes, tuning or testing purposes.

Furthermore, it should be understood that the computer system 20 can be a general purpose computer which is capable of carrying out general data processing operations. Alternatively, the computer system 20 can be a specialized computer such as a disk server, compute server, or data communications device. In a particular arrangement, the computer system 20 is a router which routes data elements within a network.

Additionally, it should be understood that the data elements can be any data which is bundled or formatted into individual portions that can be processed. Data structures such as messages, packets, frames, cells, and requests are examples of suitable data elements which can be processed by the computer system 20.

Furthermore, it should be understood that the resources 26 and the controller 28 preferably are formed by a processor executing the operating system 29 and the application 30. Alternatively, the resources 26 and controller 28 can be individual components which reside within the computer system 20. For example, the resources 26 can be provided by one processing circuit, and the controller 28 can be formed by another processing circuit.

Also, it should be understood that the resource usage database 32 does not need to reside in the computer system 20. Rather, the resource usage database 32 can reside externally (e.g., in an external storage device, in a remote system which connects to the computer system 20 over a network, etc.).

Additionally, it should be understood that the resources 26 can be either software-based or hardware-based. Some examples of software-based resources include routines (e.g., procedures, objects, functions, etc.), buffers, parameters, filters and complex computerized algorithms. U.S. application Ser. No. 09/419,035, the teachings of which were earlier incorporated by reference in their entirety, provide additional examples of software-based resources (e.g., decryption, decompression and IP switching resources). Some examples of hardware-based resources include specialized circuitry, peripheral devices, and interface hardware.

Furthermore, it should be understood that certain variations can be made to the earlier-described procedures. For example, with reference to the procedure 50 shown in FIG. 3, step 58 which involves automatically tuning the computer system 20 does not need to follow step 56 which involves terminating collection of resource usage information. Rather, step 56 can be performed at other times such as during step 54 (i.e., while collecting resource usage information) or during step 56 (i.e., while terminating collection of resource usage information). Moreover, it should be understood that step 58 is optional, and that any tuning based on the resource usage information could be performed manually by a system administrator after the system administrator has examined the collected resource usage information.

Additionally, it should be understood that the markers 42 and collectors 44 do not need to be separated from the resources 26. That is, FIG. 2 shows, by way of example only, an arrangement in which the markers 42 and collectors 44 follow resources 26. As an alternative, the markers 42 and collectors 44 can precede or be built into the resources 26. A benefit of separating the markers and collectors 44 from the resources 26 is that this arrangement minimizes the size and overhead burden placed on each resources 26. In particular, the operation of the markers 42 and collectors 44 does not disturb uninstrumented traffic flows (i.e., portions of nodal pathways which do not contain markers 42 or collectors 44). A benefit of building the markers 42 and collectors 44 into the resources 26 is that the resources 26 are then more robust in that each is capable of adjusting usage fields (i.e., operating as a marker 42) and updating the resource usage database 32 based on usage field contents (i.e., operating as a collector 44).

Furthermore, it should be understood that the combinatorial operation examples of FIGS. 8C and 9B can be more complex than that shown. In particular, the collectors 44 can invoke masking and Boolean operations which are significantly more complex (e.g., requiring more logic circuitry or logical operations on bit patterns within the usage fields 34). Also, combinations of these ways of interpreting the usage fields 34 are possible, employing one or more of the following: combinatorics, indexed lookup, individual bits set or cleared, etc.).

In one arrangement, the markers 42 and collectors 44 are configured to determine, using timestamps, an average amount of time that a particular resource 26 or group of resources 26 operates on a data element 40. For example, to determine the average amount of time for a set or series of resources 26 to process a data element 40, a marker 42 could be placed just ahead of the series and a collector could be placed just behind the series. Then, when the marker 42 encounters a data element 40, the marker 42 could set a timestamp (e.g., in a memory location associated with and a usage field 34 assigned to that data element 40, or in the resource usage database 32) and the subsequent collector 44 could retrieve the timestamp and compare it with the current time to determine the amount of time it took between the marker 42 and collector 44. The collector 44 could then add the time into a cumulative time (an aggregate processing time for the series of resources 26 to process multiple data elements 40) stored within the resource usage database 32, and bump up (or increment) a usage count (the number of data elements 40 processed by the series of resources 26). Accordingly, the average time could then be determined by dividing the cumulative time by the usage count. It should be understood that this arrangement demonstrates further capabilities of the markers 42 and collectors 44. In particular, the markers 42 and collectors 44 are capable of receiving information from various components of the computer system 20 (e.g., a clock or timestamp source that is not necessarily involved directly in the processing of data elements 40, cumulative storage entities within the resource usage database 32, etc.). These above-described aspects and features are intended to be included as part of certain embodiments of the invention.

What is claimed is:

1. In a computer having multiple resources and being capable of processing data elements using different combinations of the multiple resources, a method for measuring resource usage of the computer when processing a data element, the method comprising the steps of:

assigning a usage field to the data element;

processing the data element using a combination of the multiple resources; and adjusting contents of the assigned usage field to identify particular resources of the combination in order to measure resource usage of the computer when processing the data element.

2. The method of claim 1, further comprising the step of:

updating a resource usage database according to the contents of the usage field assigned to the data element.

3. The method of claim 2 wherein the step of updating includes the step of:

forming an identifier from the contents of the usage field, the identifier identifying a memory location within the resource usage database; and modifying contents of the identified memory location within the resource usage database.

4. The method of claim 2 wherein the step of updating includes the step of:

forming an identifier from the contents of the usage field, the identifier identifying a routine within the resource usage database; and performing the identified routine.

5. The method of claim 2 wherein the step of updating includes the step of:

performing a combinatorial operation based on the contents of the usage field; and modifying the resource usage database according to a result of the combinatorial operation.

6. The method of claim 2, further comprising the step of:

updating the resource usage database according to contents of another usage field assigned to another data element in order to store resource usage information about the computer when processing multiple data elements.

7. The method of claim 2, further comprising the step of:

automatically tuning operating parameters of the computer based on the updated resource usage database to improve operating efficiency of the computer.

8. The method of claim 1 wherein the multiple resources include, as a particular resource, a physical hardware component.

9. The method of claim 1 wherein the multiple resources include, as a particular resource, a software routine.

10. The method of claim 1 wherein the step of adjusting includes the steps of:

modifying the contents of the usage field in response to processing the data element using a first set of resources; and re-modifying the contents of the usage field in response to processing the data element using a second set of resources.

11. The method of claim 1, further comprising the step of:

dynamically activating a usage field adjustment module during operation of the computer by transitioning the usage field adjustment module from a dormant state, in which the usage field adjustment module is unable to adjust the contents of the usage field assigned to the data element, to a ready state, in which the usage field adjustment module is able to adjust the contents of the usage field assigned to the data element.

12. The method of claim 1 wherein the multiple resources are arranged as nodes which form multiple nodal pathways for processing data elements, wherein the step of processing the data element includes the step of passing the data element among resources belonging to a particular nodal pathway of the multiple nodal pathways, and wherein the method further comprises the step of:

dynamically inserting a usage field adjustment module as a node at a particular point along the particular nodal pathway to enable the usage field adjustment module to adjust the contents of the usage field assigned to the data element as the data element passes the particular point along the particular nodal pathway.

13. The method of claim 1, further comprising the steps of:

updating a resource usage database according to the contents of the usage field assigned to the data element after the data element is processed by a first set of resources; and further updating the resource usage database according to the contents of the usage field assigned to the data element after the data element is processed by a second set of resources.

14. A computer system, comprising:

multiple resources;

memory that stores an application; and a controller, coupled to the multiple resources and the memory, that operates in accordance with the application stored in the memory to process data elements using different combinations of the multiple resources, the application configuring the controller to:

assign a usage field to a data element;

process the data element using a combination of the multiple resources; and adjust contents of the assigned usage field to identify particular resources of the combination in order to measure resource usage of the computer system when processing the data element.

15. The computer system of claim 14 wherein the memory further stores a resource usage database, and wherein the application configures the controller to:

update the resource usage database according to the contents of the usage field assigned to the data element.

16. The computer system of claim 15 wherein the controller includes:

a collector which forms an identifier from the contents of the usage field, the identifier pointing to a memory location within the resource usage database.

17. The computer system of claim 15 wherein the controller includes:

a collector which forms an identifier from the contents of the usage field, the identifier identifying a routine within the resource usage database.

18. The computer system of claim 15 wherein the controller includes:

a collector that performs a combinatorial operation based on the contents of the usage field, and modifies the resource usage database according to a result of the combinatorial operation.

19. The computer system of claim 15 wherein the application further configures the controller to update the resource usage database according to contents of another usage field assigned to another data element in order to store resource usage information about the computer system when processing multiple data elements.

20. The computer system of claim 15 wherein the application further configures the controller to:

automatically tune operating parameters of the computer system based on the updated resource usage database to improve operating efficiency of the computer system.

21. The computer system of claim 14 wherein the multiple resources include, as a particular resource, a physical hardware component.

22. The computer system of claim 14 wherein the multiple resources include, as a particular resource, a software routine.

23. The computer system of claim 14 wherein the controller includes:

a first marker that modifies the contents of the usage field in response to processing the data element using a first set of resources; and a second marker that re-modifies the contents of the usage field in response to processing the data element using a second set of resources.

24. The computer system of claim 14 wherein the application configures the controller to:

dynamically activate a marker during operation of the computer by transitioning the marker from a dormant state, in which the marker is unable to adjust the contents of the usage field assigned to the data element, to a ready state, in which the marker is able to adjust the contents of the usage field assigned to the data element.

25. The computer system of claim 14 wherein the application configures the controller to process the data elements using the multiple resources by arranging the resources as nodes which form multiple nodal pathways, wherein the controller processes the data element by passing the data element among resources belonging to a particular nodal pathway of the multiple nodal pathways, and wherein the application configures the controller to:

dynamically insert a marker as a node at a particular point along the particular nodal pathway to enable the marker to adjust the contents of the usage field assigned to the data element as the data element passes the particular point along the particular nodal pathway.

26. The computer system of claim 14 wherein the controller includes:

a first collector which updates a resource usage database according to the contents of the usage field assigned to the data element after the data element is processed by a first set of resources; and a second collector which further updates the resource usage database according to the contents of the usage field assigned to the data element after the data element is processed by a second set of resources.

27. A computer program product that includes a computer readable medium having instructions stored thereon for measuring resource usage of a computer having multiple resources and being capable of processing data elements using different combinations of the multiple resources, such that the instructions, when carried out by the computer, cause the computer to perform the steps of:

assigning a usage field to a data element;

processing the data element using a combination of the multiple resources; and adjusting contents of the assigned usage field to identify particular resources of the combination in order to measure resource usage of the computer when processing the data element.

28. The computer program product of claim 27 wherein the step of adjusting includes the steps of:

modifying the contents of the usage field in response to processing the data element using a first set of resources; and re-modifying the contents of the usage field in response to processing the data element using a second set of resources.

29. The computer program product of claim 27 wherein the instructions, when carried out by the computer, further cause the computer to perform the steps of:

updating a resource usage database according to the contents of the usage field assigned to the data element; and updating the resource usage database according to contents of another usage field assigned to another data element in order to store resource usage information about the computer when processing multiple data elements.

30. The computer program product of claim 27 wherein the instructions, when carried out by the computer, further cause the computer to perform the steps of:

updating a resource usage database according to the contents of the usage field assigned to the data element after the data element is processed by a first set of resources; and further updating the resource usage database according to the contents of the usage field assigned to the data element after the data element is processed by a second set of resources.

* * * * *